3,092,596
COMPATIBLE TUNG OIL-UNSATURATED ALKYD RESIN COMPOSITIONS AND METHOD FOR PRODUCING THE SAME
Frank B. Root, Waterbury, Conn., assignor to the United States of America as represented by the Secretary of Agriculture
No Drawing. Filed Dec. 5, 1957, Ser. No. 700,920
34 Claims. (Cl. 260—22)

This invention relates to the production of heat convertible or thermosetting compositions comprising a partially reacted mixture of tung oil and an unsaturated alkyd resin. More particularly, this invention relates to a process of increasing the compatibility between tung oil and unsaturated alkyd resins and to the resulting products.

This invention further relates to the production of a potting or casting resin composition containing styrene and an unsaturated alkyd resin which has a lower initial gel period and which exhibits a lower reaction exotherm during curing or hardening. More particularly, it relates to the production of a potting or casting resin composition by incorporating into styrene-containing mixtures, a tung oil-modified unsaturated alkyd resin.

In general, when tung oil is heated with an unsaturated alkyd resin, such as polyesters formed by heating a glycol with maleic anhydride or fumaric acid, the reaction mixture produces first a turbid melt of high viscosity and then an infusible and insoluble gel on continued heating if the amount of tung oil employed is between the limits of about 12% and about 30% by weight of the alkyd resin. If a larger amount of tung oil than about 30% is employed with such an unsaturated alkyd resin, a heterogeneous mixture of gelled tung oil-alkyd product and oil results. In the case of a propylene glycol-phthalate-maleate alkyd resin, a cloudy product is obtained if more than 12% of tung oil is incorporated, and, if more than 25% of tung oil is used, it is not possible to obtain even a single phase. The resulting product, if more than 25% tung oil is added, is a heterogeneous mixture of tung oil and gelled tung oil-alkyd reaction product.

The cloudiness produced in the above-described mixtures results from the incompatibility of tung oil with the unsaturated alkyd resins.

Alkyd resins are now popularly used in both air-drying and baking varnishes and enamels. Baked films of tung oil-unsaturated alkyd resin compositions do not require the use of driers as with ordinary varnishes since the hardening process takes place as a result of a Diels-Alder addition reaction between the unsaturated alkyd resin and the conjugated double bond system of the eleostearic acid which comprises from about 75 to 80% of the tung oil. In fact, as will be shown below, it is desirable to add an antioxidant to such varnishes to suppress air drying. No volatile material is given off in this process as there would be in an esterification reaction or in a phenolic or urea resin condensation. Th resulting film is hard and free from the wrinkles frequently obtained in the oxidation and esterification type of hardening.

In accordance with one aspect of this invention, the compatibility between tung oil and an unsaturated alkyd resin is greatly increased if the alkyd resin is modified with rosin. For example, in the case of the propylene-phthalate-maleate resin mentioned above, if that material is replaced with the corresponding rosin modified resin, as much as three parts by weight of tung oil per part of resin will still give a clear product.

For the purposes of practicing the invention a mixture of tung oil and rosin-modified unsaturated alkyd resin, preferably in stoichiometrical proportions of the eleostearic acid groups contained in the tung oil and fumarate groups contained in the alkyd resin, is partially reacted. That is, the mixture of tung oil and rosin-modified unsaturated alkyd resin is heated until the viscosity has increased to the point at which the hot melt shows a tendency to "string" when allowed to drip from a stirring rod. At this viscosity, a drop of the melt when cooled on a glass plate will form a clear bead. The product is then cooled. As a variant of the above described heat bodying or partial reaction step, a solution of tung oil and the unsaturated alkyd resin in a volatile solvent can be refluxed until partial reaction as evidenced by attainment of the desired viscosity has been achieved.

In carrying out the process of the invention, it is preferred to use an unsaturated alkyd resin of the maleic anhydride or fumaric acid type that has been modified by the addition of and reaction with rosin. The term "unsaturated alkyd resin," refers to polyesters formed by heating a glycol with maleic anhydride or fumaric acid. Part of the unsaturated acid (maleic anhydride or fumaric acid) can be replaced by a polymerizably inert dibasic acid such as phthalic acid. It is of little consequence whether maleic anhydride or fumaric acid is used in the production of the unsaturated alkyd resin since considerable isomerization of maleate to fumarate can occur in the preparation of the resin.

The temperature should be kept between 100 and 150° C. and preferably about 130° C. for the process of partially reacting the tung oil and rosin-modified unsaturated alkyd resin. If a varnish is to be made from the formulation, the reaction may be checked at any desired point by the immediate addition of thinner. The particularly novel feature of the process is the production of compositions that contain a high percentage by weight of tung oil and harden by way of a Diels-Alder reaction rather than by air oxidation, condensation or polymerization to yield clear, hard, smooth baking or potting compositions.

Tung oil on the average has about 2.4 eleostearic acid radicals per glyceride molecule. The unsaturated alkyd resin portion contains a plurality of fumaric acid radicals. The addition reaction between the unsaturated portions of these two groups results in cross linking and consequent hardening. It is desirable to add from 0.01 to 0.5% of an antioxidant to the mixture of tung oil and the rosin-modified unsaturated alkyd resin or to the partial reaction product thereof to prevent the frosting or wrinkling of the surfaces exposed to the air during curing or baking. The antioxidant may be copper naphthenate, hydroquinone, resorcinol, tertiary butyl catechol or any other suitable antioxidant as will be recognized by those skilled in the art. If the antioxidant additive is not added to the tung oil-alkyd resin mixture or to the partial reaction product thereof then wrinkled or frosted surfaces may be produced by curing or baking. The compositions disclosed can be used in baked coatings, in which case pigments, fillers or plasticizers may be included as desired. The compositions of this invention can also be used as casting or potting compositions which are cured, after partial reaction by heating. Other obvious uses of the compositions of this invention that will be evident to those skilled in the art are as impregnants and adhesives. The compositions of this invention can be modified in various ways. For example, an amount of a conventional unsaturated alkyd resin (i.e. not rosin-modified) can be employed along with the rosin-modified unsaturated alkyd resin. Other drying oils, such as linseed oil, can be added to the mixture to replace a portion of the tung oil either during or after partial reaction has taken place.

The rosin-modified unsaturated alkyd resin is preferably made by heating a mixture of a glycol, fumaric acid and rosin, the glycol and fumaric acid being in equimolar proportions and the amount of rosin (considered as abietic acid) being from about 0.25 to 0.75 mole per mole of fumaric acid. The rosin reacts during the esterification of the glycol and fumaric acid through the Diels-Alder reaction. The glycol can be ethylene, propylene, diethylene or dipropylene glycol or one of the butane- or pentane-diols. Mixtures of glycols can be used.

The following are illustrative rosin-modified unsaturated alkyd resins which can be used in accordance with the invention.

ALKYD A

A mixture of 348 grams fumaric acid, 402 grams dipropylene glycol and 302 grams rosin was heated gradually in a 3-liter 3-necked flask provided with stirrer, thermometer, inlet for $CO_2$ to provide an inert atmosphere, and a condenser with trap for collecting the water formed in the esterification. At about 170° C. esterification started and after an hour from this point the temperature reached 240° C. The reaction mass was held at 240° C. for an hour and then allowed to cool to 140° C. At 140° C. the product was poured into a pan where the melt solidified to a clear, slightly tacky resin. During the reaction 109 cc. water was collected.

ALKYD B

In apparatus similar to that used for Alkyd A, a mixture of 348 grams fumaric acid, 402 grams dipropylene glycol and 453 grams rosin was heated. Esterification began when the temperature was 174° C. The temperature was then carried to 240° C. during an hour and held at 240° C. for an hour. The alkyd resin was allowed to cool to 140° C. and poured into a pan. The product was a clear brittle resin with acid number 76. During the esterification 109 cc. water was collected.

ALKYD C

This alkyd contains no rosin but may be used in conjunction with a rosin-modified unsaturated alkyd resin.

Equal moles of fumaric acid and dipropylene glycol were heated at 205–210° C. until the acid number was 52. The resin when cold was a light-colored, very viscous liquid.

The examples which follow show how, according to this invention, it is possible to incorporate markedly greater amounts of tung oil than could ordinarily be incorporated into potting and baking compositions which contain an unsaturated alkyd resin as a component. Example 1, for instance, demonstrates the incompatibility of tung oil and unsaturated alkyd resin at a ratio of only 25 parts by weight of tung oil to 100 parts by weight of unsaturated alkyd resin. Example 2 demonstrates the incorporation of tung oil into rosin-modified unsaturated alkyd resins up to and including 75 parts by weight of tung oil to 100 parts by weight of rosin-modified unsaturated alkyd resin. It will also be evident from Example 6 that, following partial reaction at relatively low heat-bodying temperatures, there remains in the composition sufficient reactivity owing to residual unsaturation so that, without benefit of an antioxidant additive, air drying (by oxidation and/or polymerization) will result in the expected concomitant defect of insufficiently heat-bodied tung oil-containing compositions, namely wrinkling, frosting, and slow drying tacky films. Baking or curing of the compositions produced by the use of this process is preferably carried out at temperatures of about 150° C. in order to complete the Diels-Alder type reaction with dispatch before any undesirable characteristics typical of the air drying and polymerization of insufficiently heat-treated tung oil-containing compositions make themselves evident.

Example 1

100 grams Alkyd C
25 grams tung oil
0.1 gram hydroquinone

This mixture when heated for 35 minutes at 100°–115° C. became very viscous. The cloudy product when thinned with xylene formed a turbid solution.

Example 2

A mixture was made of 90 grams Alkyd A, 40 grams of tung oil and 100 grams of xylene. This formed a cloudy dispersion which separated on standing. The mixture was heated under a reflux condenser for 1¼ hours (pot temperature 146° C.). A clear, very viscous solution was obtained when cold. Addition of xylene to give 50% solids formed a varnish of Gardner-Holdt viscosity P (4.00 poises).

Example 3

100 grams Alkyd A
75 grams tung oil
0.17 gram tertiary butyl catechol

The mixture was heated in a beaker to 130° C. and held for ½ hour at that temperature. The mixture (originally cloudy) gradually became clear and the viscosity increased, heating being discontinued when the melt showed a slight string when allowed to drip from the end of the thermometer. At this stage a drop on a glass plate was a clear, firm bead when cold. Xylene was added to form a 50% solution of Gardner-Holdt viscosity B (0.65 poise).

A film of the varnish when allowed to air-dry was clear and tacky for 3 days.

Example 4

100 grams Alkyd A
75 grams tung oil
0.17 gram tertiary butyl catechol

The mixture was heated in a beaker to 130° C. and held at that temperature for ½ hour. The mixture (originally cloudy) gradually became clear and the viscosity increased, heating being discontinued when the melt showed a slight string when allowed to drip from the end of the thermometer. At this stage a drop on a glass plate was a clear, firm bead when cold. Xylene was added to form a 50% solution of Gardner-Holdt viscosity B (0.65 poise).

A film baked an hour at 150° C. was smooth, clear and tough.

Example 5

100 grams Alkyd B
50 grams tung oil
0.15 gram tertiary butyl catechol

These were heated as in Example 4 for 35 minutes, then thinned with 150 grams xylene. Gardner-Holdt viscosity D (1.00 poise).

A film of the varnish when air-dried for 3 days was soft and slightly frosted. A film baked an hour at 150° C. was smooth, clear and tough. Contact with water for 24 hours caused no spotting.

Example 6

To illustrate the effect of omission of the antioxidant and air-drying on the film, a mixture of 100 grams of Alkyd B and 50 grams of tung oil was heated, as in the previous example, for 35 minutes at a temperature of 130° C., then thinned with 150 grams of xylene. The Gardner-Holdt viscosity D was 1.00 poise.

A film from this varnish, baked at 150° C. was hard but frosted.

Addition of 0.6% Pb and 0.03% Co (as naphthenates) produced a varnish which air-dried in 5 hours to a frosted film.

A baked film from this drier-containing varnish had a wrinkled finish.

Example 7

100 grams Alkyd B
60 grams tung oil
10 grams bodied linseed oil Gardner-Holdt Z–2 (36.2 poises)
0.2 gram tertiary butyl catechol This mixture was heated at 130° C. for 45 minutes almost to the gel stage and thinned with 190 grams xylene, forming a light-colored varnish of viscosity U (6.27 poises). A film baked at 150° C. was hard, clear and smooth in an hour.

Example 8

This mixture was heated at 130° C. for 45 minutes almost to the gel stage and thinned with 190 grams xylene, forming a light-colored varnish of viscosity U (6.27 poises). A film baked at 80° C. was soft and frosted after 24 hours.

Example 9

96 grams Alkyd B
12 grams Alkyd C
68 grams tung oil
0.18 gram tertiary butyl catechol The mixture was heated at 130° C. for 30 minutes. It was then thinned with 184 grams xylene, forming a clear varnish of viscosity D (1.00 poise). A baked film was clear and tough.

Example 10

100 grams Alkyd B
50 grams tung oil
0.15 gram tertiary butyl catechol

The mixture was heated as in Example 6 and then poured into a mold where it was heated for 4 hours at a temperature which was gradually raised to 160° C. When cool the product was a clear, tough casting showing low shrinkage. The surface exposed to the air during cure was smooth and hard. If the antioxidant is omitted a frosted exposed surface is formed during the cure.

In the above examples methyl tungate, blown methyl tungate tung oil acids, or allyl eleostearate can be used in place of tung oil itself.

Another aspect of this invention involves the addition of tung oil to laminating and casting or potting compositions containing styrene. Polyester resins are commonly used as polymerizable comonomers in conjunction with styrene in such compositions.

According to this aspect of the invention, the addition of tung oil to styrene-polyester compositions results in a number of unexpected advantages. Among these are increased compatibility of polyester with styrene, decreased initial gel time, and decreased exotherm. The exotherm, that is, the maximum temperature reached during curing, is of special importance in those cases where the resin is to be used as a casting or laminating compound for heat sensitive materials. Furthermore, a decreased exotherm greatly diminishes shrinkage of the casting or laminating compound when the product is cooled.

The following example shows that tung oil increases the tolerance of an unsaturated polyester resin for styrene.

Example 11

A polyester resin prepared as described under Alkyd C above, but containing ethylene glycol and maleic anhydride was not compatible with a casting composition containing 33% styrene. The upper limit of compatibility of styrene with the alkyd of this example was about 25%. This alkyd was reacted with 5% by weight of tung oil and the compatibility for styrene was increased thereby to 33% by weight.

The following examples show the effect of mixing tung oil with a polyester resin.

Example 12

The components, alkyd (Alkyd C above, but containing ethylene glycol and maleic anhydride), 67 parts by weight; styrene, 33 parts by weight; tung oil 5 parts by weight of the casting composition were mixed together at room temperature and a polymerization catalyst (0.6% methyl ethyl ketone peroxide and 0.5% cobalt naphthenate) added to induce polymerization. The use of 5% by weight of tung oil in this formulation, however, results in a casting composition that is not entirely clear. To obtain a clear, hard, transparent product it was necessary to rosin-modify the alkyd resin, as shown in the following example.

Example 13

67 parts by weight of Alkyd B, 33 parts by weight of styrene, and 5 parts by weight of tung oil were mixed together at room temperature as in Example 12 and the polymerization catalyst, in an amount of 0.6 part by weight, was added to induce polymerization. After polymerization the product was a clear, hard transparent homogeneous resin.

Example 14

Incorporation of tung oil in unsaturated polyester resins results in a marked decrease in exotherm during polymerization or curing, and also a decrease in initial gel time. The data in the following table illustrates the action of tung oil as compared with linseed oil. Linseed oil was included for comparison with tung oil for the purpose of showing that the lowered exotherm and decreased initial gel time which characterizes unsaturated polyester resins containing tung oil is not the result of mere dilution or of the presence of simple unsaturation. Linseed oil is unsaturated to approximately the same degree as tung oil but with the important differences that the unsaturation in tung oil is conjugated and the unsaturation of linseed oil non-conjugated. In the following table the mixtures were compounded at room temperature and the polymerization catalyst (cobalt naphthenate) added at the time it was desired to initiate the polymerization.

| Mixture | (1) | (2) | (3) |
|---|---|---|---|
| Propylene Phthalate Maleate (gms.) | 20 | 20 | 20 |
| Styrene (gms.) | 10 | 10 | 10 |
| Methyl Ethyl Ketone Peroxide (percent) | 0.6 | 0.6 | 0.6 |
| Cobalt Naphthenate (percent) | 0.6 | 0.6 | 0.6 |
| Raw Linseed Oil (percent) | | 5 | |
| Tung Oil (percent) | | | 5 |
| Gel Time (min.) | 14 | 16 | 12 |
| Peak Exotherm (° C.) | 133 | 97 | 63 |
| Time from Gel to Peak Exotherm (min.) | 19 | 26 | 35 |

Tung oil accelerates gelation and its effect on the exotherm is clearly greater than that produced by dilution (linseed oil). In the case of both linseed oil and tung oil, cloudy castings result, which indicates that at the effective level employed (5 parts by weight of tung oil) the oils were not entirely compatible with the polyester resin.

The following example shows that the results of increased tolerance of an unsaturated alkyd resin for styrene, decreased initial gelling time, and lower exotherm are also obtained by the use of various tung oil derivatives.

Example 15

In this example methyl tungate, blown methyl tungate, tung oil acids, and allyl eleostearate were substituted for tung oil.

The following table shows the effect on exotherm and gel time of the above tung oil derivatives incorporated in an unsaturated polyester resin. The resin is a styrene solution (33%) of propylene phthalate maleate.

Proportions are by weight. Incorporation of the various ingredients was carried out as described in Example 13.

| Mixture | 1 | 2 | 3 | 4 | 5 | 6 | 7 |
|---|---|---|---|---|---|---|---|
| Resin | 100 | 100 | 100 | 100 | 100 | 100 | 100 |
| Methyl Tungate | | 5 | | | | | |
| Blown Methyl Tungate | | | 5 | | | | |
| Tung Oil Acids | | | | 5 | | | |
| Allyl Eleostearate | | | | | 2.5 | | 2.5 |
| Methyl Ethyl Ketone Peroxide | 0.6 | 0.6 | 0.6 | 0.6 | 0.6 | 1.2 | 1.2 |
| Cobalt Naphthenate | 0.5 | 0.5 | 0.5 | 0.5 | 0.5 | 0.2 | 0.2 |
| Gel Time (min.) | 9 | 13 | 8 | 8 | 11 | 7 | 8 |
| Peak Exotherm (° C.) | 138 | 30 | 49 | 38 | 98 | 152 | 139 |
| Time from Gel to Peak Exotherm (min.) | 14 | 32 | 33 | 14 | 37 | 6 | 11 |
| Appearance of Casting | Clear | Cloudy | Clear | Cloudy | Clear | Clear | Clear |

This example shows that derivatives of tung oil are effective for the reduction of peak exotherm. It should be noted however, that only blown methyl tungate is compatible (produces a clear casting) at the 5% level.

*Example 16*

A mixture of styrene and rosin-modified alkyd resin, prepared as described under "Alkyd B," above, was substituted for the resin solution in styrene used in the previous example.

The following table shows the effect of tung oil, methyl tungate and allyl eleostearate on gelation and exotherm at the 5% level. The alkyd comprised two moles of maleic anhydride, two moles of propylene glycol and one mole of rosin. Linseed oil is included again in this table for comparison. Proportions are by weight. Incorporation of the ingredients listed in the following table was carried out as described in Example 13 above.

| Mixture | (A) | (B) | (C) | (D) | (E) |
|---|---|---|---|---|---|
| Rosin-Modified Alkyd | 67 | 67 | 67 | 67 | 67 |
| Styrene | 33 | 33 | 33 | 33 | 33 |
| Tung Oil | | 5 | | | |
| Allyl Eleostearate | | | 5 | | |
| Methyl Tungate | | | | 5 | |
| Linseed Oil | | | | | 5 |
| Methyl Ethyl Ketone Peroxide | 0.6 | 0.6 | 0.6 | 0.6 | 0.6 |
| Cobalt Naphthenate | 0.5 | 0.55 | 0.5 | 0.5 | 0.5 |
| Gel Time (min.) | 60 | 42 | 60 | 60 | 60 |
| Peak Exotherm (°C.) | 92 | 31 | 31 | 30 | 38 |
| Time from start to Peak Exotherm (min.) | 98 | 36 | 32 | 35 | 92 |
| Time at Peak Exotherm (min.) | 1 | 33 | 35 | 40 | 10 |
| Appearance of Casting | Clear | Clear | Clear | Clear | Cloudy |

I claim:

1. The process for preparing a coating composition hardenable by a Diels-Alder polymerization reaction and having increased compatibility with tung oil which comprises heating at a temperature of about from 100° to 150° C. a polyester reaction product of rosin, a glycol, and an unsaturated acid from the group consisting of fumaric and maleic acids, an antioxidant to prevent air oxidation and air drying of a coating produced from said composition, and from about 12% to 75% by weight of said polyester reaction product of a material selected from the group consisting of tung oil, tung oil fatty acids, methyl tungate, air-blown methyl tungate, and allyl eleostearate, and then thinning the heated mixture.

2. The process for preparing a coating composition hardenable by a Diels-Alder polymerization reaction and having increased compatibility with tung oil which comprises heating at a temperature of about 130° C. a polyester reaction product of rosin, a glycol, and an unsaturated acid from the group consisting of fumaric and maleic acids, an antioxidant to prevent air oxidation and air drying of a coating produced from said composition, and about from 12% to 75% by weight of said polyester reaction product of tung oil, and then thinning the heated mixture.

3. A process for increasing the tolerance of unsaturated alkyd resins for styrene and for reducing the polymerization exotherm which comprises incorporating, at room temperature, within a mixture of styrene and an unsaturated alkyd resin comprising a polyester of a glycol and an unsaturated acid from the group consisting of fumaric and maleic acids, a minor proportion by weight based on the weight of the resin-styrene mixture of an additive selected from the group consisting of tung oil, tung oil fatty acids, methyl tungate, air-blown methyl tungate, and allyl eleostearate.

4. The process of claim 3 in which the additive is tung oil.

5. The process of claim 3 in which the additive is tung oil fatty acids.

6. The process of claim 3 in which the additive is methyl tungate.

7. The process of claim 3 in which the additive is air-blown methyl tungate.

8. The process of claim 3 in which the additive is allyl eleostearate.

9. A potting and casting composition comprising an unsaturated alkyd resin comprising a polyester of a glycol and an unsaturated acid from the group consisting of fumaric and maleic acids, about from 25% to 50% by weight of said alkyd resin of styrene, and an additive for increasing the compatibility of the alkyd resin and styrene and for lowering the polymerization exotherm selected from the group consisting of tung oil, tung oil fatty acids, methyl tungate, air-blown methyl tungate, and allyl eleostearate.

10. The composition of claim 9 wherein the additive is tung oil.

11. The composition of claim 10 wherein the additive is tung oil fatty acids.

12. The composition of claim 10 wherein the additive is methyl tungate.

13. The composition of claim 10 wherein the additive is air-blown methyl tungate.

14. The composition of claim 10 wherein the additive is allyl eleostearate.

15. A potting and casting composition comprising a rosin-modified unsaturated alkyd resin comprising the polyester reaction product of rosin, a glycol, and an unsaturated acid from the group consisting of fumaric and maleic acids, about from 25% to 50% by weight of said alkyd resin of styrene, and an additive for increasing the compatibility of the alkyd resin and styrene and for lowering the polymerization exotherm selected from the group consisting of tung oil, tung oil fatty acids, methyl tungate, air-blown methyl tungate, and allyl eleostearate.

16. The composition of claim 15 wherein the additive is tung oil.

17. The composition of claim 15 wherein the additive is tung oil fatty acids.

18. The composition of claim 15 wherein the additive is methyl tungate.

19. The composition of claim 15 wherein the additive is air-blown methyl tungate.

20. The composition of claim 15 wherein the additive is allyl eleostearate.

21. A clear, hard synthetic resin comprising the copolymerization reaction product of a rosin-modified unsaturated alkyd resin and about from 25% to 50% by weight of said alkyd resin of styrene wherein a portion of the unsaturated groups of the alkyd resin have added by means of a diene addition reaction to the conjugated unsaturated groups provided by a material selected from the group consisting of tung oil, tung oil fatty acids, methyl tungate, air-blown methyl tungate, and allyl eleostearate, said alkyd resin comprising the polyester reaction product of rosin, a glycol, and an unsaturated acid from the group consisting of fumaric and maleic acids.

22. The resin of claim 21 wherein the conjugated unsaturated groups are provided by tung oil.

23. The resin of claim 21 wherein the conjugated unsaturated groups are provided by tung oil fatty acids.

24. The resin of claim 21 wherein the conjugated unsaturated groups are provided by methyl tungate.

25. The resin of claim 21 wherein the conjugated unsaturated groups are provided by air-blown methyl tungate.

26. The resin of claim 21 wherein the conjugated unsaturated groups are provided by allyl eleostearate.

27. A coating composition hardenable by a Diels-Alder polymerization reaction comprising an antioxidant for preventing air oxidation and air drying of a coating produced from said composition and the resinous reaction product obtained by heating at a temperature of about from 100° to 150° C. a polyester reaction product of rosin, a glycol, and an unsaturated acid from the group consisting of fumaric and maleic acids and about from 12% to 75% by weight of said polyester reaction product of a material selected from the group consisting of tung oil, tung oil fatty acids, methyl tungate, air-blown methyl tungate, and allyl eleostearate.

28. A coating composition hardenable by a Diels-Alder polymerization reaction comprising an antioxidant for preventing air oxidation and air drying of a coating produced from said composition and the resinous reaction product obtained by heating at a temperature of about 130° C. a polyester reaction product of rosin, a glycol, and an unsaturated acid from the group consisting of fumaric and maleic acids, and about from 12% to 75% by weight of said polyester reaction product of tung oil.

29. A process for producing a clear, hard synthetic resin which comprises mixing at room temperature a rosin-modified unsaturated alkyd resin comprising the polyester reaction product of rosin, a glycol, and an unsaturated acid from the group consisting of fumaric and maleic acids, about from 25% to 50% by weight of said alkyd resin of styrene, and an additive selected from the group consisting of tung oil, tung oil fatty acids, methyl tungate, air-blown methyl tungate, and allyl eleostearate, adding to the so-produced mixture a polymerization catalyst comprising cobalt naphthenate and methyl ethyl ketone peroxide, and permitting polymerization to proceed without addition of heat from any external source until there is obtained a clear, hard resin.

30. The process of claim 29 wherein the additive is tung oil.

31. The process of claim 29 wherein the additive is tung oil fatty acids.

32. The process of claim 29 wherein the additive is methyl tungate.

33. The process of claim 29 wherein the additive is air-blown methyl tungate.

34. The process of claim 29 wherein the additive is allyl eleostearate.

References Cited in the file of this patent

UNITED STATES PATENTS

| | | |
|---|---|---|
| 1,870,453 | Honel | Aug. 9, 1932 |
| 2,181,054 | Hampton | Nov. 21, 1939 |
| 2,537,949 | Adams | Jan. 16, 1951 |
| 2,695,896 | Ehring | Nov. 30, 1954 |

OTHER REFERENCES

Page 2734, Webster's New International Dictionary of the English Language, 2nd Ed. unabridged, published, 1956, Springfield, Mass., G. & C. Merriam Co.